US012117336B2

(12) United States Patent
Iwano et al.

(10) Patent No.: US 12,117,336 B2
(45) Date of Patent: Oct. 15, 2024

(54) OPTICAL FIBER SENSING SYSTEM, OPTICAL FIBER SENSING METHOD, AND OPTICAL FIBER SENSING APPARATUS

(71) Applicant: NEC Corporation, Tokyo (JP)

(72) Inventors: Tadayuki Iwano, Tokyo (JP); Satoru Ishii, Tokyo (JP); Yoshinori Kitahara, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 17/765,074

(22) PCT Filed: Oct. 7, 2019

(86) PCT No.: PCT/JP2019/039486
§ 371 (c)(1),
(2) Date: Mar. 30, 2022

(87) PCT Pub. No.: WO2021/070222
PCT Pub. Date: Apr. 15, 2021

(65) Prior Publication Data
US 2022/0397449 A1    Dec. 15, 2022

(51) Int. Cl.
G01H 9/00    (2006.01)
G01D 5/353    (2006.01)
G01D 21/00    (2006.01)
H04B 10/073    (2013.01)

(52) U.S. Cl.
CPC ......... *G01H 9/004* (2013.01); *G01D 5/35358* (2013.01); *G01D 21/00* (2013.01); *H04B 10/073* (2013.01)

(58) Field of Classification Search
CPC .... G01H 9/004; G01D 5/35358; G01D 21/00; H04B 10/073
See application file for complete search history.

(56) References Cited

U.S. PATENT DOCUMENTS

2005/0082467 A1    4/2005    Mossman

FOREIGN PATENT DOCUMENTS

| JP | H06-020177 A | 1/1994 |
| JP | 2002-269656 A | 9/2002 |
| JP | 2003-232043 A | 8/2003 |

OTHER PUBLICATIONS

International Search Report for PCT Application No. PCT/JP2019/039486, mailed on Dec. 17, 2019.

*Primary Examiner* — Leslie C Pascal
(74) *Attorney, Agent, or Firm* — Sughrue Mion, PLLC

(57) ABSTRACT

An optical fiber sensing system according to this disclosure includes: a first optical fiber network (10A) configured to detect first sensing information about a monitoring target; a second optical fiber network (10B) configured to detect second sensing information about the monitoring target; a first reception unit (21A) configured to receive a first light signal from the first optical fiber network (10A); a second reception unit (21B) configured to receive a second light signal from the second optical fiber network (10B); and an identification unit (22) configured to identify the monitoring target, based on the first sensing information included in the first light signal, and the second sensing information included in the second light signal.

14 Claims, 23 Drawing Sheets

| DISTANCE FROM OPTICAL FIBER SENSING APPARATUS | AREA |
|---|---|
| a~b km | A |
| b~c km | B |
| c~d km | C |
| d~e km | D |
| ⋮ | ⋮ |

Fig. 2

| OPTICAL FIBER NW | POLICY |
|---|---|
| 10A | ENTIRELY ALLOWED |
| 10B | PARTIALLY ALLOWED |
| 10C | PROHIBITED |

Fig. 11

| DISTANCE FROM OPTICAL FIBER SENSING APPARATUS | HEIGHT | AREA |
|---|---|---|
| a~b km | h1 m | A |
| b~c km | h2 m | B |
| c~d km | h3 m | C |
| d~e km | h4 m | D |
| ⋮ | ⋮ | ⋮ |

Fig. 18

OPTICAL FIBER SENSING SYSTEM, OPTICAL FIBER SENSING METHOD, AND OPTICAL FIBER SENSING APPARATUS

This application is a National Stage Entry of PCT/JP2019/039486 filed on Oct. 7, 2019, the contents of all of which are incorporated herein by reference, in their entirety.

TECHNICAL FIELD

The present disclosure relates to an optical fiber sensing system, an optical fiber sensing method, and an optical fiber sensing apparatus.

BACKGROUND ART

Optical fibers are used to provide high-speed optical communication. By monitoring the fluctuation in loss due to a stress applied to an optical fiber, the optical fiber can be used as a sensor.

For example, Patent Literature 1 discloses that an optical fiber sensor is installed in a river area, a deformation of an embankment, transition in a levee body, a river level and the like are observed, and an optical fiber sensor is installed at a place in a levee, and flooded situations and the like in an urban area are observed.

CITATION LIST

Patent Literature

[Patent Literature 1]
Japanese Unexamined Patent Application Publication No. 2002-269656

SUMMARY OF INVENTION

Technical Problem

In recent year, a technique of achieving an advanced monitor function by monitoring vibrations, sounds, a temperature and the like that are superimposed on a light signal transmitted in an optical fiber, has been attracting attention.

However, in recent years, accompanying advanced informatization and automatization of the society, targets to be monitored by optical fibers, and needs for provided services have variously been broadened. Accordingly, it is difficult to meet the needs only through a simple individual monitoring function as in Patent Literature 1.

An object of the present disclosure is to solve the problem described above, and provide an optical fiber sensing system, an optical fiber sensing method, and an optical fiber sensing apparatus that are capable of utilizing optical fibers laid at various sites in various states, and achieving a service and an application through more advanced optical fiber sensing.

Solution to Problem

An optical fiber sensing system according to an aspect includes:
a first optical fiber network configured to detect first sensing information about a monitoring target;
a second optical fiber network configured to detect second sensing information about the monitoring target;
a first reception unit configured to receive a first light signal from the first optical fiber network;
a second reception unit configured to receive a second light signal from the second optical fiber network; and
an identification unit configured to identify the monitoring target, based on the first sensing information included in the first light signal, and the second sensing information included in the second light signal.

An optical fiber sensing method according to an aspect includes:
a first reception step of receiving a first light signal from a first optical fiber network that detects first sensing information about a monitoring target;
a second reception step of receiving a second light signal from a second optical fiber network that detects second sensing information about the monitoring target; and
an identification step of identifying the monitoring target, based on the first sensing information included in the first light signal, and the second sensing information included in the second light signal.

An optical fiber sensing apparatus according to an aspect includes:
a first reception unit configured to receive a first light signal from a first optical fiber network that detects first sensing information about a monitoring target;
a second reception unit configured to receive a second light signal from a second optical fiber network that detects second sensing information about the monitoring target; and
an identification unit configured to identify the monitoring target, based on the first sensing information included in the first light signal, and the second sensing information included in the second light signal.

Advantageous Effects of Invention

According to the aspects described above, advantageous effects can be achieved that are capable of providing an optical fiber sensing system, an optical fiber sensing method, and an optical fiber sensing apparatus that are capable of utilizing optical fibers laid at various sites in various states, and achieving a service and an application through more advanced optical fiber sensing.

BRIEF DESCRIPTION OF DRAWINGS

FIG. 2 shows an example of an association table that an identification unit holds according to the example embodiment.

FIG. 11 shows an example of a policy DB shown in FIG. 10.

FIG. 18 shows an example of an association table that the identification unit holds according to the example embodiment.

DESCRIPTION OF EMBODIMENTS

Figure 1:
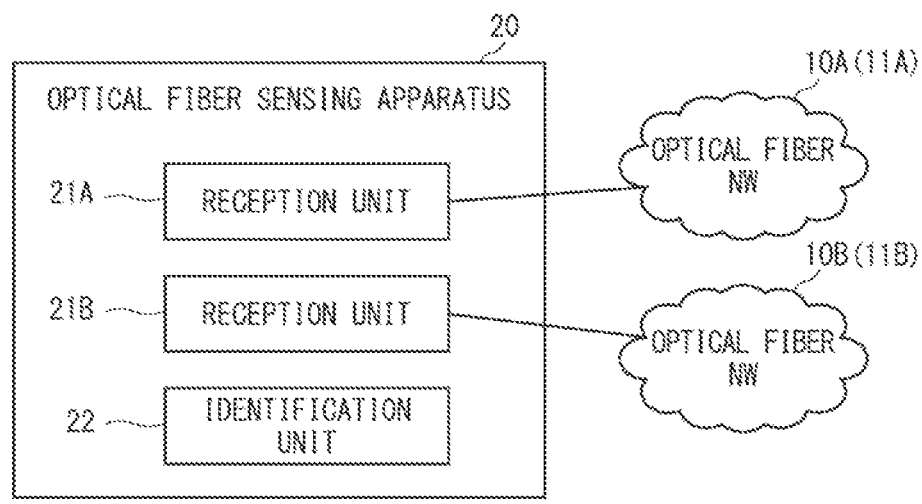
FIG. 1 shows a basic configuration example of an optical fiber sensing system according to an example embodiment.

Hereinafter, referring to the drawings, an example embodiment of the present disclosure is described. Note that the following description and drawings are appropriately abridged and simplified for the sake of clarifying description. In each of the following drawings, the same elements are assigned the same symbols, and redundant description is omitted as required.

<Example Embodiment>

First, referring to FIG. 1, a basic configuration example of an optical fiber sensing system according to an example embodiment is described.

As shown in FIG. 1, the optical fiber sensing system according to the example embodiment includes optical fiber networks (in the drawing, appropriately represented as optical fiber NWs (Networks)) 10A and 10B, and an optical fiber sensing apparatus 20. The optical fiber sensing apparatus 20 includes reception units 21A and 21B, and an identification unit 22. In the following description, in a case of not identifying which one of the optical fiber networks 10A and 10B is, it is appropriately called an optical fiber network 10. Likewise, the reception units 21A and 21B are appropriately called a reception unit 21. Note that FIG. 1 shows the example where the two optical fiber networks 10A and 10B are deployed. However, the number of optical fiber networks 10 may be two or more, and is not limited to two.

The optical fiber network 10A includes at least one optical fiber 11A for sensing. The optical fiber network 10B includes at least one optical fiber 11B for sensing. Note that the optical fiber networks 10A and 10B may be existing optical fiber networks, or newly laid optical fiber networks. In the following description, in a case of not identifying which one of the optical fibers for sensing is, it is appropriately called an optical fiber 11 for sensing.

The reception unit 21A receives a light signal from the optical fiber network 10A. For example, the reception unit 21A transmits pulsed light to the optical fiber 11A for sensing included in the optical fiber network 10A, and receives, as a light signal, back scattered light caused accompanying transmission of the pulsed light through the optical fiber 11A for sensing.

Likewise, the reception unit 21B receives a light signal from the optical fiber network 10B.

Monitoring targets that the optical fiber sensing system according to this example embodiment monitors are, for example, as follows.

- states that include the deterioration of structures, such as utility poles, bridges, tunnels, pipe arrangements, and dams
- states that include deterioration of railway tracks, and roads
- situations of railway track and roads
- behavior of people, vehicles, animals and the like
- monitoring of volcanic eruptions, earthquakes, mudflows, ground subsidence, depression, rock falling, erosion, limnic eruption, wind and flood damages, wind damages, flood damages, salt damages, snow damages, blizzards, freezing damages, lightning, high temperatures (heat waves, extreme heats, warm winter), low temperatures (cold winter, cold summer), occurrence of natural disasters, such as natural fires, and damage states due to natural disasters.
- occurrence of blackouts, construction works, etc.
- weather, ambient temperatures, ground temperatures, wind flow rates, and precipitation
- monitoring of communication failures Here, the vibrations, sounds, temperature and the like about the monitoring target are transferred to the optical fiber 11A for sensing. As a result, they are superimposed on the light signal transmitted through the optical fiber 11A for sensing, and the characteristics (e.g., wavelength) of the light signal are changed. Accordingly, the optical fiber network 10A can detect sensing information that includes the vibrations, sounds and temperature about the monitoring target.

Likewise, the optical fiber network 10B can detect sensing information that includes the vibrations, sounds and temperature about the monitoring target. The detected sensing information is superimposed on the light signal transmitted through the optical fiber 11B for sensing.

Note that it is only required that the sensing information includes at least one of the vibrations, sounds, and temperature about the monitoring target.

The identification unit 22 collects the sensing information superimposed on the light signal received by the reception unit 21A from the optical fiber network 10A, while collecting the sensing information superimposed on the light signal received by the reception unit 21B from the optical fiber network 10B. The identification unit 22 then identifies the monitoring target, based on the sensing information superimposed on the light signal received from the optical fiber network 10A, and the sensing information superimposed on the light signal received from the optical fiber network 10B.

At this time, as described below, the identification unit 22 can identify positions (distances from the optical fiber sensing apparatus 20) on the optical fibers 11A and 11B for sensing where the sensing information has been detected. For example, when the light signal that the reception unit 21A receives is back scattered light, the identification unit 22 identifies the position on the optical fiber 11A for sensing where the sensing information superimposed on the back scattered light has been detected, based on the temporal difference between a time when the reception unit 21A transmitted the pulsed light to the optical fiber 11A for sensing, and a time when the reception unit 21A received the back scattered light from the optical fiber 11A for sensing. According to a similar method, the identification unit 22 identifies the position on the optical fiber 11B for sensing where the sensing information superimposed on the light signal received from the optical fiber network 10B.

In this case, the identification unit 22 includes information that associates the position of the optical fiber 11 for sensing and an actual geographical position. For example, as shown in FIG. 2, the identification unit 22 may include an association table that associates the distance from the optical fiber sensing apparatus 20 on the optical fiber 11 for sensing with each area or point on a map. Accordingly, the identification unit 22 can determine what area on the map the sensing information was detected in, that is, what area on the map the identified monitoring target resides in. In this case, for example, when the position on the optical fiber 11 for sensing detected by the optical fiber 11 for sensing is 10 km, the identification unit 22 may identify that the position is in an A area or at an A point on the map. Here, the position on the optical fiber 11 for sensing is not limited to the distance from the optical fiber sensing apparatus 20, and may be, for example, the distance from a specific point on the optical fiber 11 for sensing. The actual geographical position is not limited to an area on the map. Alternatively, an area or a point may be managed by character information. Note that the identification unit 22 may hold the association table as shown in FIG. 2, for each of the optical fibers 11A and 11B for sensing.

Hereinafter, a method of identifying the monitoring target in the identification unit 22 is described.

The sensing information superimposed on the light signals received by the reception units 21A and 21B includes, for example, vibration information about the monitoring target. The vibration information serves as a specific dynamic fluctuation pattern that is different in the pattern of the degree of vibration intensity, vibration point, frequency fluctuation transition and the like according to the monitoring target. Likewise, the sensing information includes a specific dynamic fluctuation pattern, such as of sounds, and temperatures and the like about the monitoring target.

According to these vibration pattern, acoustic pattern, temperature pattern and the like, the monitoring target can be identified.

Accordingly, the identification unit 22 can identify the monitoring target by analyzing the specific dynamic fluctuation pattern according to the monitoring target included in the sensing information superimposed on the light signals received by the reception units 21A and 21B.

Figure 3:
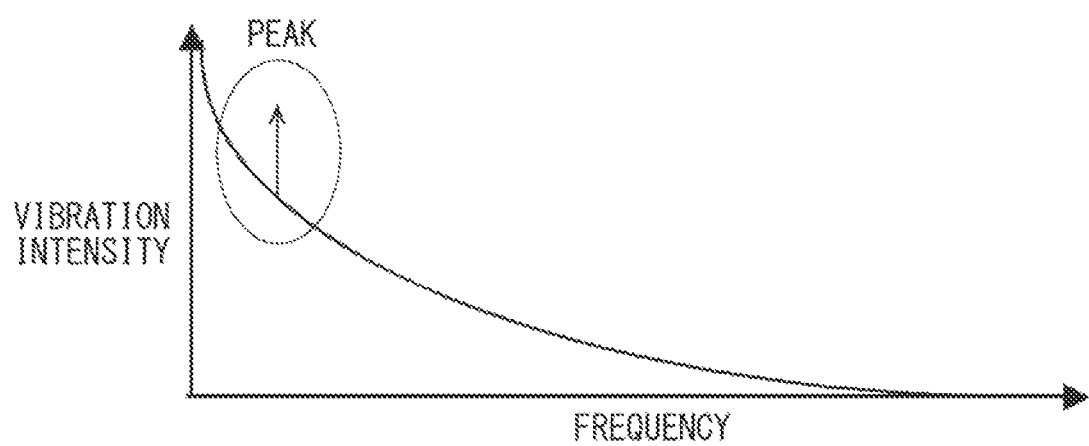
FIG. 3 shows an example of a vibration pattern included in sensing information superimposed on a light signal that a reception unit has received according to the example embodiment.
Figure 4:
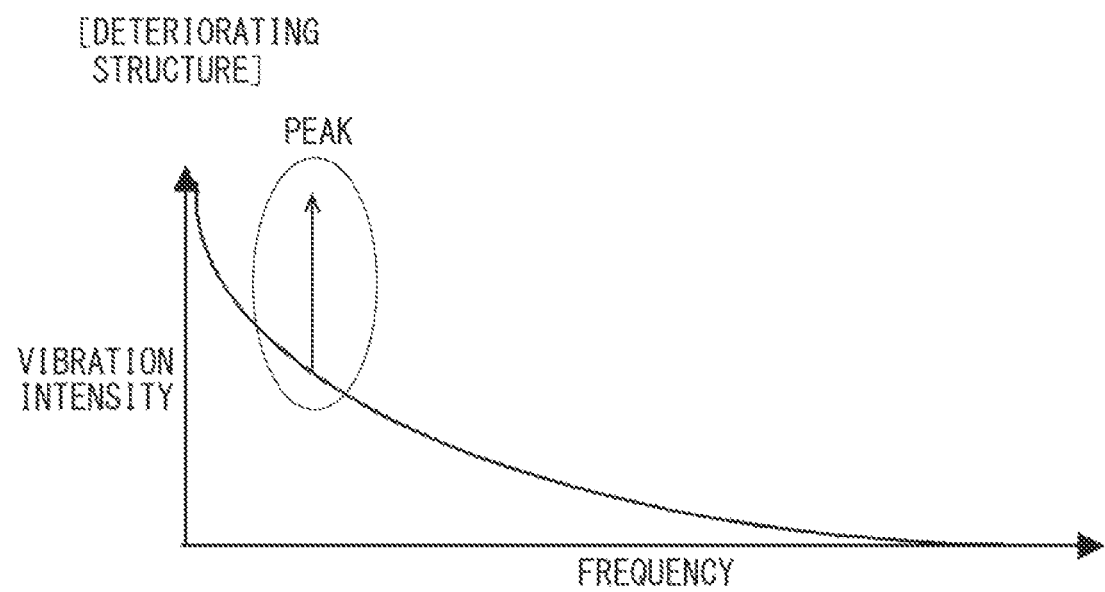
FIG. 4 shows an example of a vibration pattern included in sensing information superimposed on a light signal that the reception unit has received according to the example embodiment.

For example, in a case of detecting the deterioration of a structure, the optical fibers 11A and 11B for sensing are laid to the structure. The identification unit 22 collects sensing information from light signals received from the optical fibers 11A and 11B for sensing by the respective reception units 21A and 21B, and extracts vibration patterns caused at the structure as shown in FIGS. 3 and 4 from the collected sensing information. FIGS. 3 and 4 show vibration patterns obtained by applying FFT (Fast Fourier Transform) to the vibration pattern that has the abscissa axis indicating time and the ordinate axis indicating vibration intensity. For the vibration patterns shown in FIGS. 3 and 4, the abscissa axis indicates the frequency, and the ordinate axis indicates the vibration intensity.

According to the vibration patterns shown in FIGS. 3 and 4, a peak of the vibration intensity occurs. The frequency at which the peak occurs is different according to the deteriorating state of the structure. As a specific example, according to the vibration pattern of the deteriorating structure (FIG. 4), the frequency at which the peak of the intensity occurs is shifted to the high-frequency side (or low-frequency side), in comparison with the vibration pattern of the normal structure (FIG. 3). Accordingly, the identification unit 22 can detect the deterioration of the structure, based on the frequency at which the peak of the vibration intensity occurs.

Figure 5:
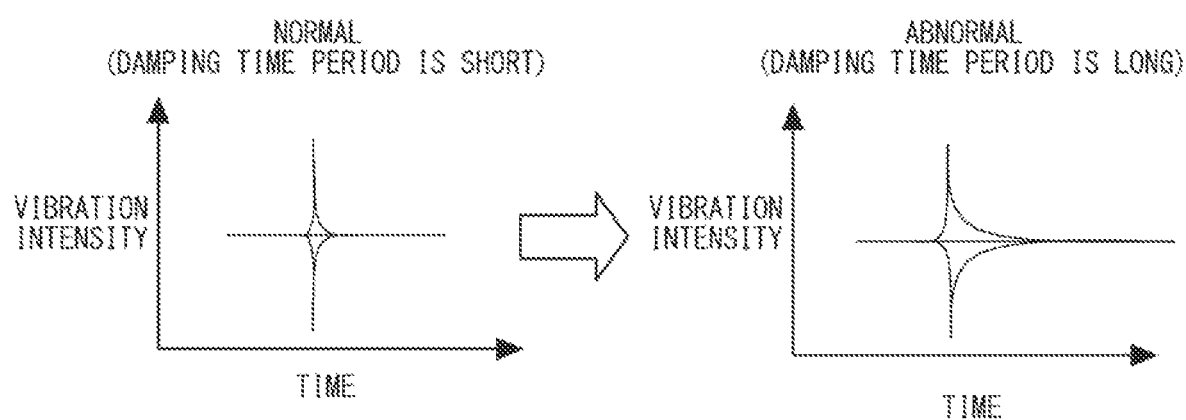
FIG. 5 shows an example of a vibration pattern included in sensing information superimposed on a light signal that the reception unit has received according to the example embodiment.

In an example of detecting a natural phenomenon, the optical fibers 11A and 11B for sensing are laid on the ground or seafloor. The identification unit 22 collects sensing information from light signals received from the optical fibers 11A and 11B for sensing by the respective reception units 21A and 21B, and extracts a vibration pattern caused on the ground or seafloor as shown in FIG. 5 from the collected sensing information. For the vibration patterns shown in FIG. 5, the abscissa axis indicates the frequency, and the ordinate axis indicates the vibration intensity.

According to the vibration pattern shown in FIG. 5, vibrations caused on the ground or seafloor are subsequently damped. For example, in a case where a structural change of the ground, a collapse or the like possibly occurs as a natural phenomenon, the damping time becomes long. Accordingly, the identification unit 22 can detect that structural change of the ground, a collapse and the like can possibly occur, based on the damping time in the vibration pattern.

The identification unit 22 may identify the monitoring target using pattern matching. For example, the identification unit 22 causes a storage unit, not shown, to preliminarily store a vibration pattern according to the monitoring target, as a pattern for matching, with respect to each monitoring target. For example, in a case where the monitoring target is the deterioration of a structure, a plurality of vibration patterns according to the deterioration level of the structure may be stored. After the identification unit 22 extracts the vibration pattern from the light signal, this unit compares the extracted vibration pattern with the pattern for matching. When there is a pattern for matching of which matching rate with the vibration pattern is equal to or higher than a threshold and which has been extracted from the light signal among the patterns for matching, the identification unit 22 identifies the monitoring target associated with the pattern for matching.

Alternatively, the identification unit 22 may identify the monitoring target using a learning model for identifying a monitoring target using a convolutional neural network (CNN). For example, the identification unit 22 receives a plurality of combinations that each include training data indicating a monitoring target, and a vibration pattern according to the monitoring target, preliminarily constructs a learning model, and causes the storage unit, not shown, to preliminarily store the model. For example, in the case where the monitoring target is the deterioration of a structure, a plurality of combinations that each include training data indicating the deterioration level of a structure, and a vibration pattern at the deterioration level may be input, and a learning model may be constructed. After the identification unit 22 extracts the vibration pattern from the light signal, this unit inputs the extracted vibration pattern into the learning model. Accordingly, the identification unit 22 obtains the monitoring target as an output result of the learning model.

Note that the example where the identification unit 22 identifies the monitoring target using the vibration pattern has been described above. Alternatively, the monitoring target may be identified using an acoustic pattern or a temperature pattern. In the example where the deterioration of a structure or a natural phenomenon is detected as the monitoring target has been described above. The method described above is also applicable similarly to a case of identifying another monitoring target.

Subsequently, referring to FIG. 6, a basic configuration operation of the optical fiber sensing system according to the example embodiment is described.

Figure 6:
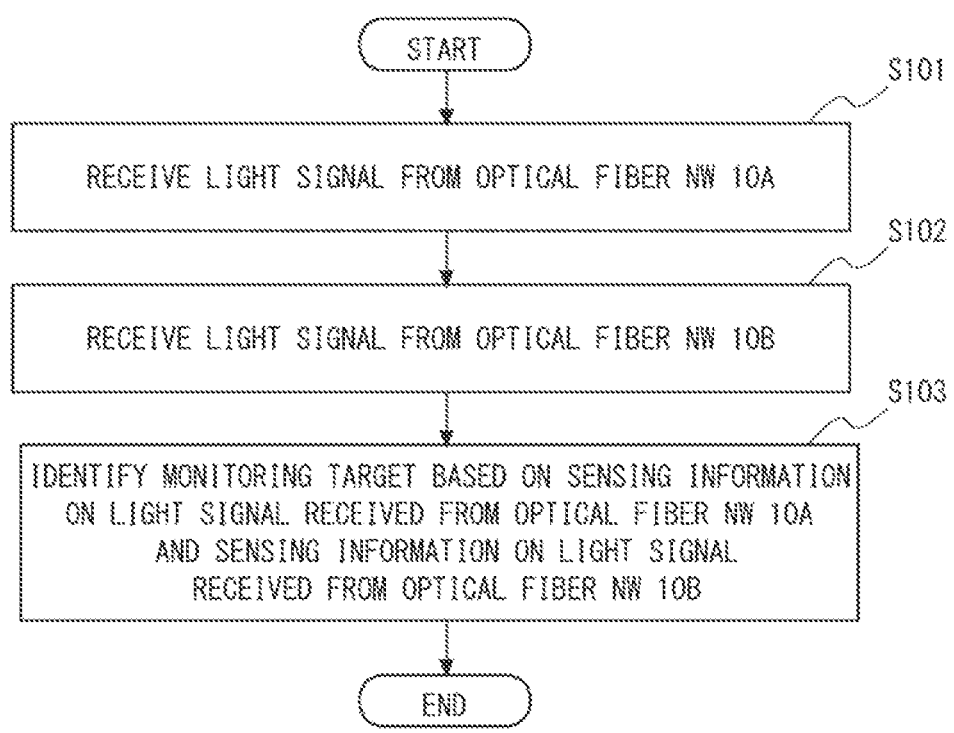
FIG. 6 is a flowchart showing an example of a basic operation of an optical fiber sensing system according to the example embodiment.

As shown in FIG. 6, the reception unit 21A receives light signal from the optical fiber network 10A (step S101). The reception unit 21B receives a light signal from the optical fiber network 10B (step S102). Note that the order of steps S101 and S102 may be inverted.

Subsequently, the identification unit 22 identifies the monitoring target, based on the sensing information about the monitoring target included in the light signal that the reception unit 21A has received from the optical fiber network 10A, and the sensing information about the monitoring target included in the light signal that the reception unit 21B has received from the optical fiber network 10B (step S103).

As described above, according to this example embodiment, the reception unit 21A receives the light signal from the optical fiber network 10A, and the reception unit 21B receives the light signal from the optical fiber network 10B. The identification unit 22 identifies the monitoring target, based on the sensing information about the monitoring target included in the light signal that the reception unit 21A has received from the optical fiber network 10A, and the sensing information about the monitoring target included in the light signal that the reception unit 21B has received from the optical fiber network 10B.

As described above, according to this example embodiment, the monitoring target is not monitored separately through the optical fiber networks 10A and 10B, but the monitoring target is monitored through both the two optical fiber networks 10A and 10B instead. Accordingly, the optical fibers 11A and 11B for sensing laid at various sites and in various states can be utilized, and services and applications through more advanced optical fiber sensing can be achieved.

<Specific Example of Example Embodiment>

Hereinafter, specific examples implemented by further specifically embodying this example embodiment are described.

<Method of Isolating Optical Fiber Networks>

The example where the two optical fiber networks 10A and 10B are provided has been described above. However, the number of optical fiber networks 10 is only required to be plural.

Figure 7:
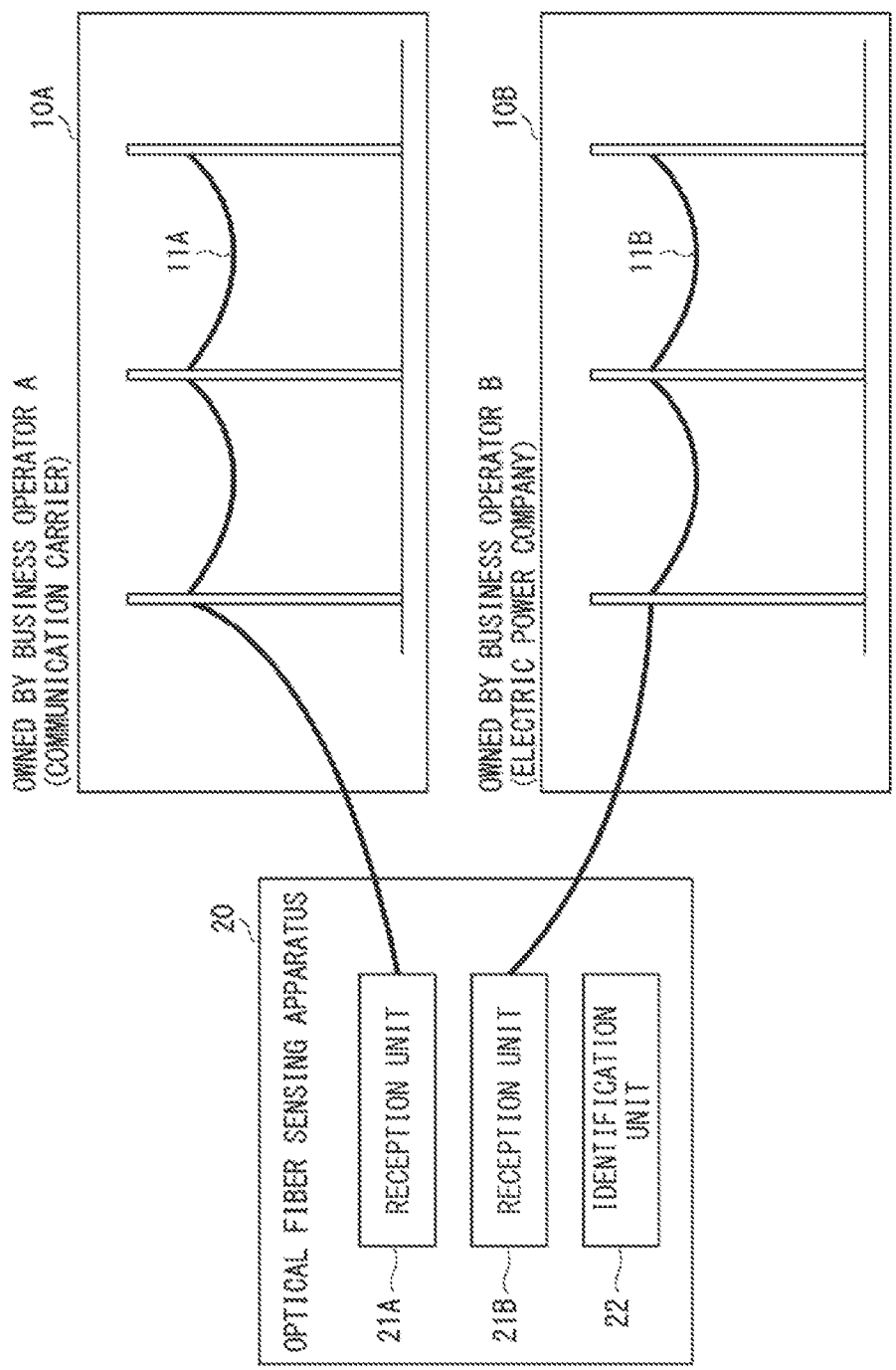
FIG. 7 shows a modified configuration example of an optical fiber sensing system according to the example embodiment.

In this case, as shown in FIG. 7, the optical fiber networks 10 may be owned by business operators different from each other. In the example in FIG. 7, the optical fiber network 10A is an optical fiber network owned by a business operator A (communication carrier), while the optical fiber network 10B is an optical fiber network 10B owned by a business operator B (electric power company). Note that the optical fiber networks 10 are not limited to those owned by the communication carrier and the electric power company, but may be those owed by another business types, such as a railroad company, a road management company and the like. The optical fiber networks 10 may be those owed by different business operators in different business types, or owned by different business operators in the same business type.

Figure 8:
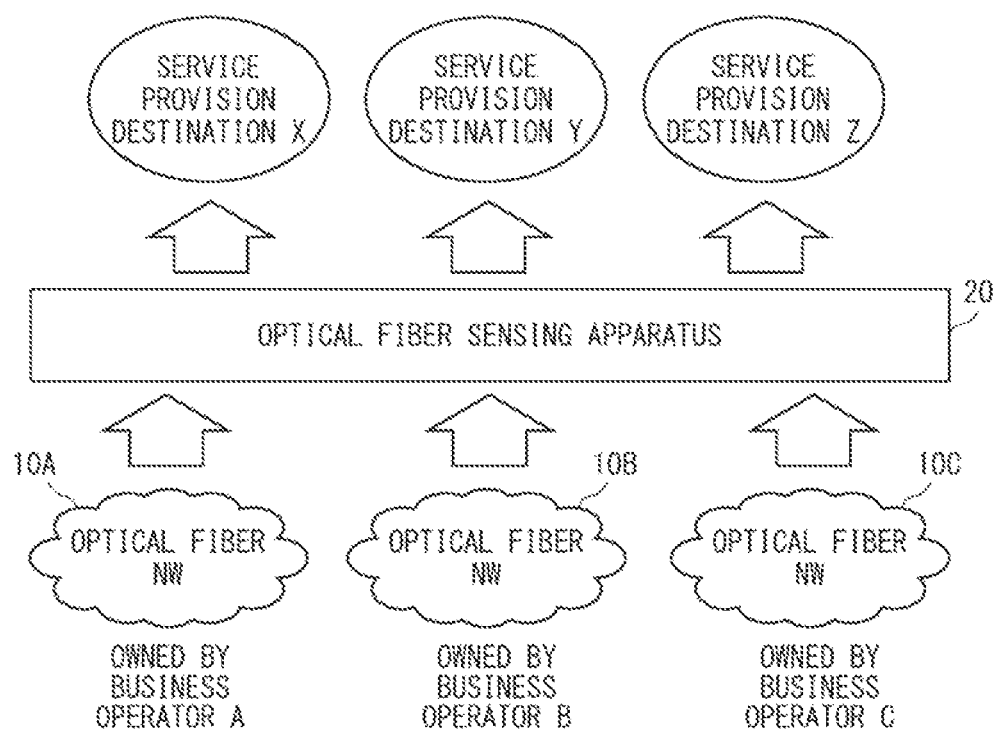
FIG. 8 shows an example of a service form where an optical fiber sensing apparatus provides monitoring target data for a service provision destination according to the example embodiment.

By allowing the plurality of optical fiber networks 10 to be owned by business operators different from each other, a service of providing a service provision destination with data on a monitoring target identified by sensing information detected by the plurality of optical fiber networks 10 can be achieved as shown in FIG. 8. The optical fiber sensing apparatus 20 can be achieved as a platform in a case of achieving such a service. In this case, the identification unit 22 may provide the service provision destination with the data on the monitoring target, or a providing unit that provides the service provision destination with the data on the monitoring target may be additionally provided. Note that it is conceivable that the service provision destination is, for example, a country, a local government, a company, an individual person, etc. However, there is no specific limitation.

The plurality of optical fiber networks 10 may be owned by a country, local government, an organization (police, a fire department), which are different from each other.

The plurality of optical fiber networks 10 may be at different geographical places. For example, the plurality of optical fiber networks 10 may be disposed in different prefectures. The plurality of optical fiber networks 10 may be disposed individually on the land and sea.

The plurality of optical fiber networks 10 may be laid in different manners of laying the optical fibers 11 for sensing. For example, the plurality of optical fiber networks 10 may have different materials, states (for example, buried in the earth, overhead wiring at utility poles and the like) and heights with which the optical fibers 11 for sensing are laid.

The plurality of optical fiber networks 10 may mixedly include a public optical fiber network 10 and a private optical fiber network 10. The public optical fiber network 10 is, for example, is an optical fiber network that includes an optical fiber 11 for sensing laid at utility poles, roads, railway tracks and the like as public infrastructure. The private optical fiber network 10 is, for example, an optical fiber network that includes an optical fiber 11 for sensing laid in a building, a shopping mall, a home, a factory and the like as private infrastructures.

Here, the private optical fiber networks 10 may possibly include an optical fiber network 10 for highly confidential sensing information. Accordingly, it is preferable that for each private optical fiber network 10, a policy about disclosure of sensing information be configured, and sensing information be filtered according to the policy.

Figure 9:
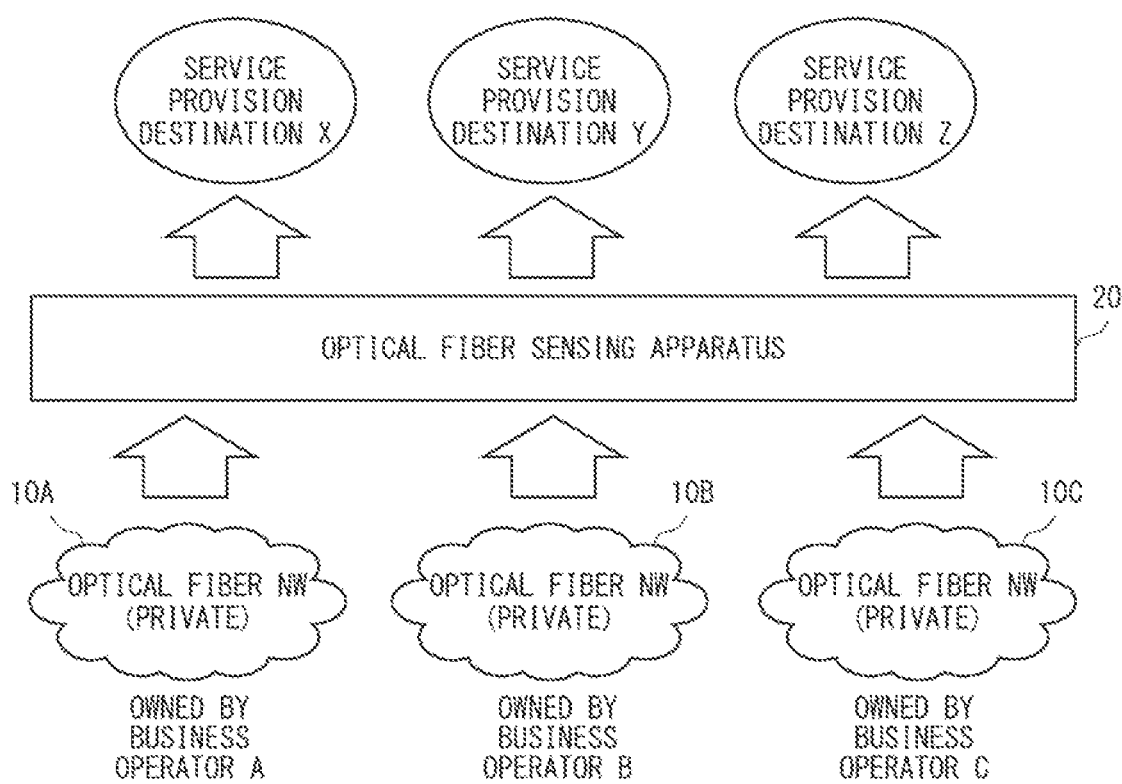
FIG. 9 shows an example of a service form where the optical fiber sensing apparatus provides monitoring target data for the service provision destination according to the example embodiment.

Hereinafter, an example of a method of filtering the sensing information is described. Here, as shown in FIG. 9, it is assumed that the optical fiber networks 10A to 10C respectively owned by business operators A to C are private optical fiber networks.

Figure 10:
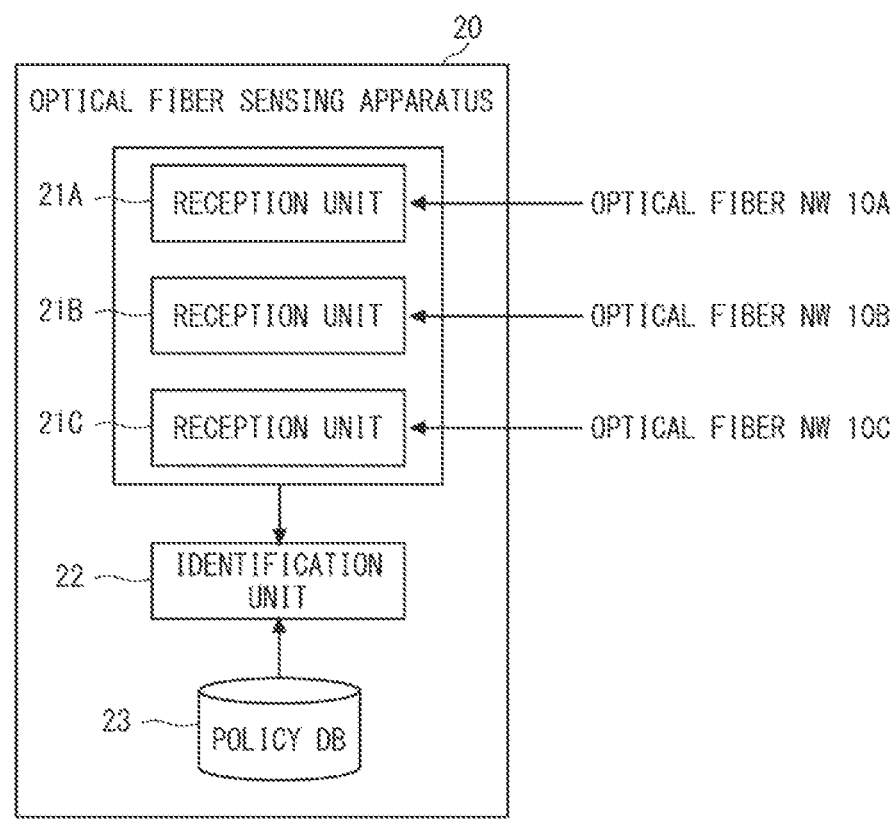
FIG. 10 shows a modified configuration example of an optical fiber sensing apparatus according to the example embodiment.

As shown in FIG. 10, the optical fiber sensing apparatus 20 additionally includes a policy DB (Data Base) 23. As shown in FIG. 11, the policy DB 23 is a database that stores policies about disclosure of sensing information for the respective private optical fiber networks 10A to 10C. In FIG. 11, "ENTIRELY ALLOWED" indicates that the sensing information is allowed to be used wherever the provision destination of the monitoring target data is. "PARTIALLY ALLOWED" indicates that the sensing information is allowed to be used only when the provision destination of the monitoring target data is among some preset service provision destinations. "PROHIBITED" indicates that the sensing information is allowed to be used only when the provision destination of the monitoring target data is the party itself. Note that a mechanism of changing the policy by time of day, or temporarily changing the policy due to occurrence of a disaster may be additionally provided. Accordingly, for example, even in the cases of "PARTIALLY ALLOWED" and "PROHIBITED", the sensing information can be allowed to be used in case of occurrence of a disaster. The identification unit 22 applies filtering to the sensing information superimposed on the light signals received by the reception units 21A to 21C, according to the policies stored in the policy DB 23. The identification unit 22 identifies the monitoring target, based on the sensing information having not been excluded by filtering. For example, it is assumed that the identification unit 22 applies filtering to the sensing information superimposed on the light signal received by the reception unit 21B. As a result, when the provision destination of the monitoring target data identified based on the sensing information is the preset service provision destination, the identification unit 22 identifies the monitoring target, based on the sensing information, and the identified monitoring target data is provided for the preset service provision destination. Meanwhile, when the provision destination of the monitoring target data identified by the sensing information is not any of the preset service provision destinations, the identification unit 22 does not identify the monitoring target or provide monitoring target data.

<Sensing Information Collecting Method>

According to the above description, the reception unit 21 collects the sensing information superimposed on the light signal by receiving the light signal from the optical fiber 11 for sensing included in the optical fiber network 10. However, the sensing information collecting method is not limited thereto.

Figure 12:
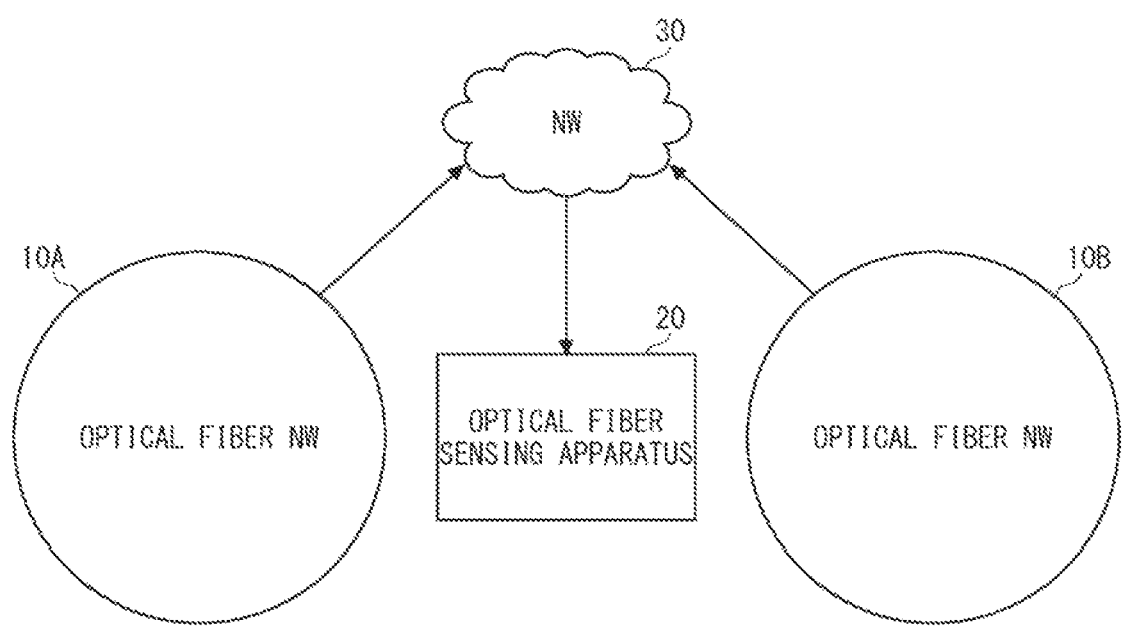
FIG. 12 shows an example of a method of the reception unit collecting sensing information according to the example embodiment.

For example, as shown in FIG. 12, the reception unit 21A may collect the sensing information from the optical fiber network 10A via a network 30 for optical fiber communication. Likewise, the reception unit 21B may collect the sensing information from the optical fiber network 10B via the network 30 for optical fiber communication.

<Sensing Coverage of Optical Fiber Sensing>

The identification unit 22 identifies the monitoring target, based on the sensing information collected from the optical fiber network 10A, and the sensing information collected from the optical fiber network 10B.

Figure 13:
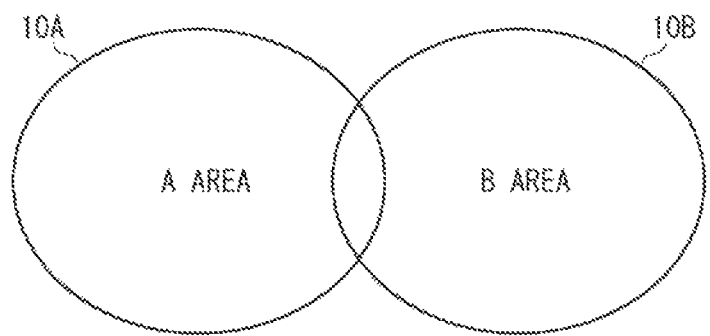
FIG. 13 shows an example of a sensing coverage of the optical fiber sensing system according to the example embodiment.

Accordingly, as shown in FIG. 13, the sensing coverage can be broadened to an area obtained by combining an A area that is the sensing coverage of the optical fiber network 10A with a B area that is the sensing coverage of the optical fiber network 10B.

Accordingly, in a wider area, the traffic of roads and vehicles can be monitored, the weather, ambient temperatures, and ground temperatures can be monitored, and disasters and blackouts can be detected. Furthermore, companies in the same business affiliation located in different areas can hand off the sensing information.

<Estimation of Monitoring Target in Area where No Optical Fiber Network is Deployed>

Figure 14:
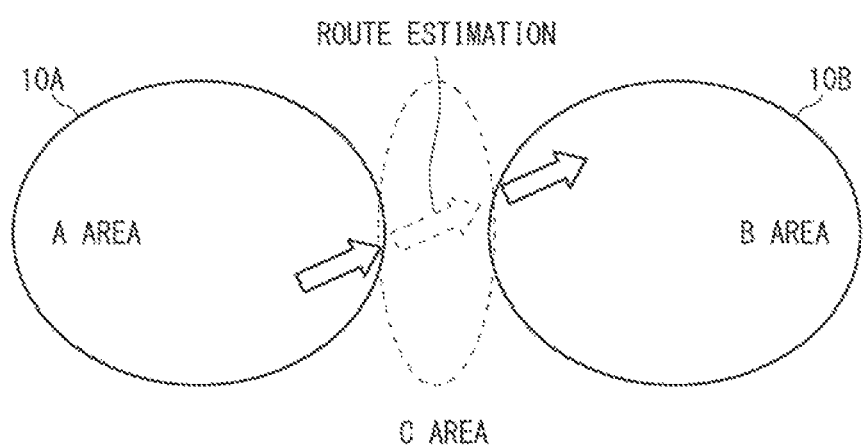
FIG. 14 shows an example of a sensing coverage of the optical fiber sensing system according to the example embodiment.

In the example in FIG. 13, the overlapping portion resides between the A area, which is the sensing coverage of the optical fiber network 10A, and the B area, which is the sensing coverage of the optical fiber network 10B. However, as shown in FIG. 14, the A area and the B area are separated from each other in some cases. In this case, the identification unit 22 may estimate a monitoring target in a C area residing between the A area and the B area, based on an identification result of the monitoring target in the A area and an identification result of the monitoring target in the B area.

In the example in FIG. 14, the identification unit 22 identifies the position of a vehicle or the like in the A area, based on the vibration pattern and the like included in the sensing information collected from the optical fiber network 10A, and further identifies the traveling route of the vehicle or the like, based on the fluctuation of the identified position. Likewise, the identification unit 22 identifies the position and traveling route of the vehicle or the like in the B area, based on the vibration pattern and the like included in the sensing information collected from the optical fiber network 10B. Accordingly, the identification unit 22 can estimate the traveling route in the C area, based on the position serving as an exit of the A area on the traveling route and the position serving as an entrance of the B area on the traveling route.

In this case, the identification unit 22 can identify the traveling speed of the vehicle or the like in each of the A area and the B area, based on the position of the vehicle or the like and the time when it is present thereat. Accordingly, for example, when the traveling speed in the A area is 30 km and the traveling speed in the B area is 40 km, the identification unit 22 can estimate that the vehicle or the like is accelerating in the C area.

The identification unit 22 can identify the temperature in the A area, based on a temperature pattern included in the sensing information collected from the optical fiber network 10A. Likewise, the identification unit 22 can identify the temperature in the B area, based on a temperature pattern included in the sensing information collected from the optical fiber network 10B. Accordingly, for example, when the temperature in the A area is 20° C. and the temperature in the B area is 30° C., the identification unit 22 can estimate that the temperature in the C area is about 25° C.

The identification unit 22 can identify the positions of occurrence of blackouts and the distribution of the positions of occurrence in the A area, based on a vibration pattern and the like included in the sensing information collected from the optical fiber network 10A. Likewise, the identification unit 22 can identify the positions of occurrence of blackouts and the distribution of the positions of occurrence in the B area, based on a vibration pattern and the like included in the sensing information collected from the optical fiber network 10B. Accordingly, for example, the identification unit 22 can estimate the positions of occurrence of blackouts in the C area, based on the distribution of occurrence of blackouts in the A area and the distribution of occurrence of blackouts in the B area.

Subsequently, referring to FIG. 15, an example of an operation of estimating a monitoring target in an area where no optical fiber network 10 is deployed in the optical fiber sensing system according to the example embodiment, is described. Here, as with the example in FIG. 14, the example of estimating the monitoring target in the C area between the A area and the B area, is described.

Figure 15:
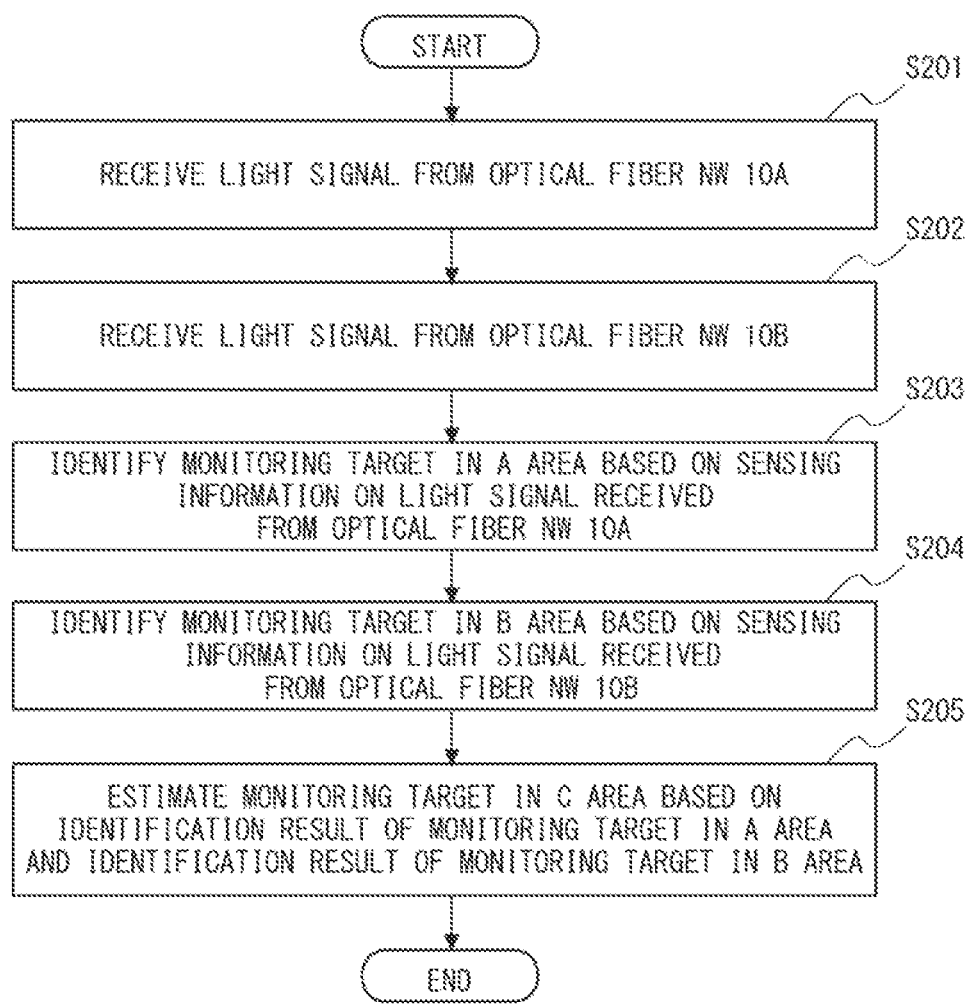
FIG. 15 is a flowchart showing an example of an operation of estimating a monitoring target in an area where no optical fiber network is deployed in the optical fiber sensing system according to the example embodiment.

As shown in FIG. 15, the reception unit 21A receives the light signal from the optical fiber network 10A of which the sensing coverage is the A area (step S201). The reception unit 21B receives light signal from the optical fiber network 10B of which the sensing coverage is the B area (step S202). Note that the order of steps S201 and S202 may be inverted.

Subsequently, the identification unit 22 identifies the monitoring target in the A area, based on the sensing information about the monitoring target included in the light signal received by the reception unit 21A from the optical fiber network 10A (step S203). The identification unit 22 identifies the monitoring target in the B area, based on the sensing information about the monitoring target included in the light signal received by the reception unit 21B from the optical fiber network 10B (step S204). Note that the order of steps S203 and S204 may be inverted.

Subsequently, the identification unit 22 estimates a monitoring target in a C area residing between the A area and the B area, based on an identification result of the monitoring target in the A area and an identification result of the monitoring target in the B area (step S205).

<Identification of Positions of Vibration Source and Sound Source>

For example, in a case where only one optical fiber network 10 including one optical fiber 11 for sensing is deployed, the identification unit 22 can identify the direction of a vibration source (e.g., the hypocenter of an earthquake etc.) when the vibration source is at a place apart from the optical fiber 11 for sensing. However, the identification unit 22 cannot identify the position of the vibration source.

On the other hand, in a case where a plurality of optical fiber networks 10 are deployed, the identification unit 22 can identify the position of the vibration source even when the vibration source is at a place apart from the optical fiber 11 for sensing.

Hereinafter, referring to FIG. 16, a method of the identification unit 22 identifying the position of the vibration source is described. The example in FIG. 16 assumes that two optical fiber networks 10, i.e., an optical fiber network 10A including one optical fiber 11A for sensing, and an optical fiber network 10B including one optical fiber 11B for sensing are deployed.

The optical fiber 11A for sensing detects vibrations at a plurality of detection points on the optical fiber 11A for sensing. The identification unit 22 obtains the distribution of vibrations detected at the plurality of detection points (the intensity of detected vibrations, and the time when the vibrations are detected), based on sensing information collected from the optical fiber 11A for sensing. Here, at a detection point near the vibration source, vibrations are detected early and the detected vibration intensity is large in comparison with a case at another point. Through use of this, the identification unit 22 identifies a direction D1 of the vibration source, based on the distribution of vibrations detected at the plurality of detection points. Likewise, the identification unit 22 obtains the distribution of vibrations detected at the plurality of detection points (the intensity and time), based on the sensing information collected from the optical fiber 11B for sensing, and identifies a direction D2 of the vibration source, based on the obtained distribution of vibrations. The identification unit 22 then identifies the position at which the direction D1 and the direction D2 intersect with each other, as the position of the vibration source.

Figure 16:
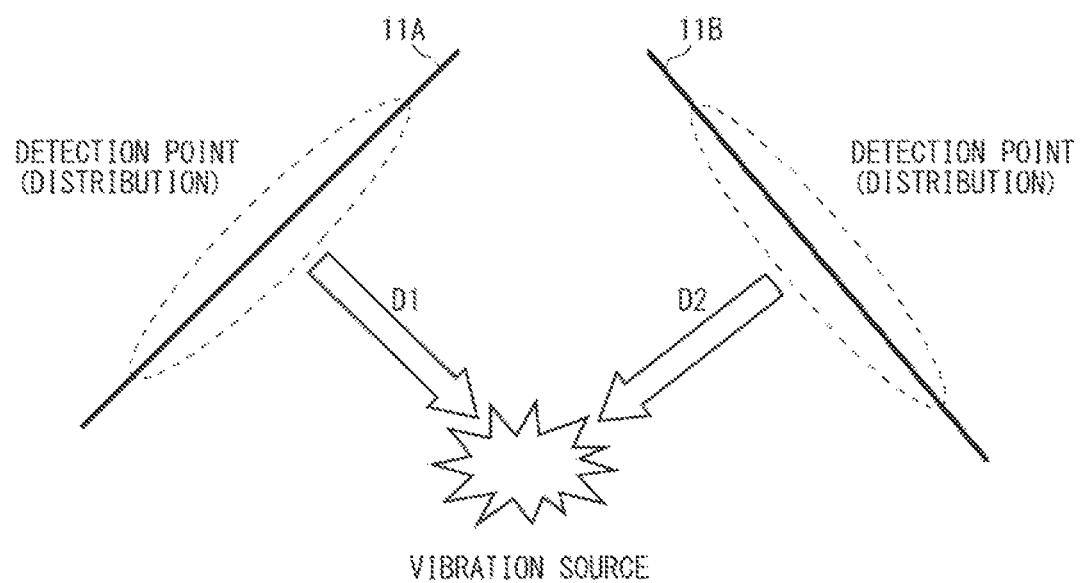
FIG. 16 shows an example of a method of the identification unit identifying the position of a vibration source according to the example embodiment.

Note that in the example in FIG. 16, the identification unit 22 identifies the position of the vibration source. This unit can also identify the position of the sound source. In the case of identifying the position of the sound source, the identification unit 22 may identify the position of the sound source, using the distribution (the intensity and time) of acoustics detected at the plurality of detection points on the optical fiber 11 for sensing.

<Deployment of Plurality of Optical Fiber Networks in Same Area>

By deploying a plurality of optical fiber networks 10 in the same area, the sensing accuracy of the optical fiber sensing can be improved.

For example, in a case where only one optical fiber network 10 including one optical fiber 11 for sensing is deployed, sensing information that the identification unit 22 can obtain is one-dimensionally arranged sensing information.

On the other hand, for example, as shown in FIG. 16, in the case where the optical fiber 11A for sensing included in the optical fiber network 10A and the optical fiber 11B for sensing included in the optical fiber network 10B are laid, the identification unit 22 can obtain two-dimensionally arranged sensing information (for example, sensing information with the optical fiber 11A for sensing being on the X-axis and the optical fiber 11B for sensing being on the Y-axis). As a result, the sensing accuracy can be improved.

In a case where a plurality of optical fibers 11 for sensing included in the respective optical fiber networks 10 are laid at heights different from each other in the same area (for example, a certain optical fiber 11 for sensing is overhead-wired, while another optical fiber 11 for sensing is buried in the earth), the identification unit 22 can obtain three-dimensionally arranged sensing information. Accordingly, the sensing accuracy can be further improved.

Figure 17:
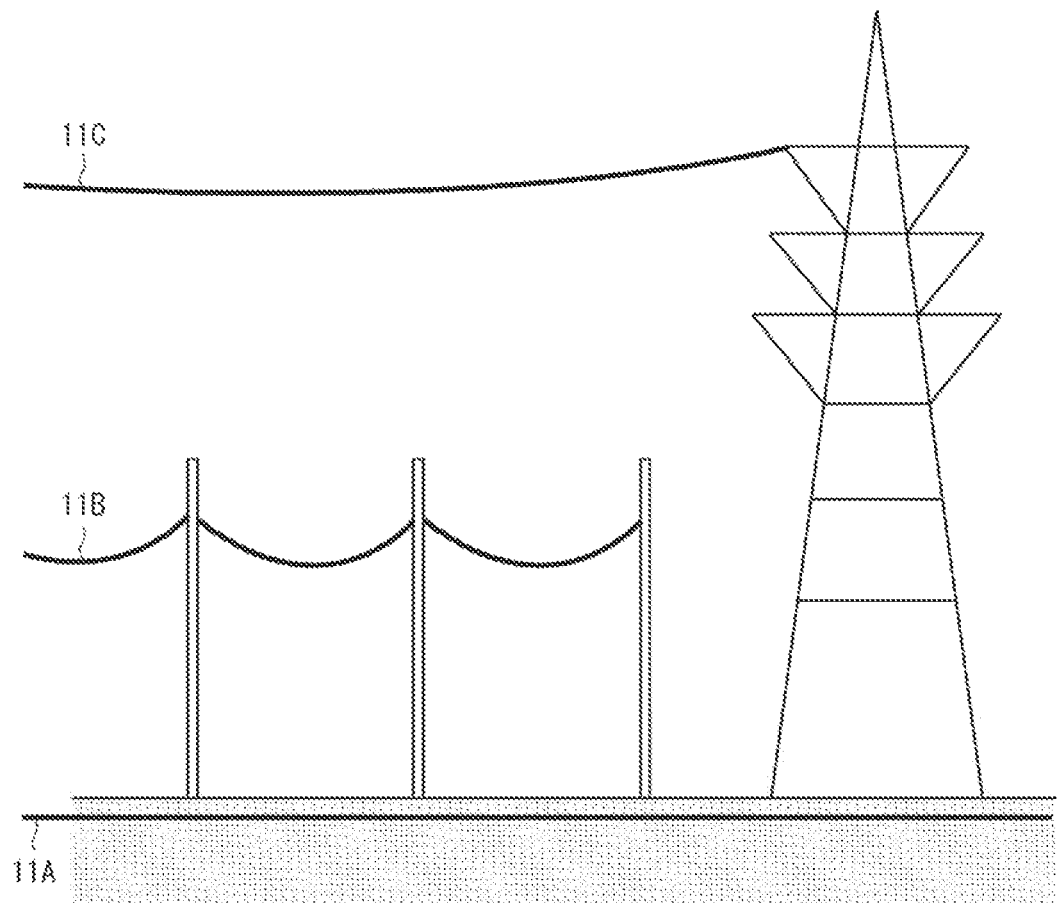
FIG. 17 shows an example of a method of laying a plurality of optical fibers for sensing at heights different from each other according to the example embodiment.

FIG. 17 shows an example where three optical fibers 11A to 11C for sensing respectively included in three optical fiber networks 10A to 10C are laid at heights different from each other. In the example in FIG. 17, the optical fiber 11A for sensing is buried in the earth, the optical fiber 11B for sensing is overhead-wired on utility poles, and the optical fiber 11C for sensing is overhead-wired on steel towers higher than the utility poles. The optical fiber 11C for sensing can be achieved as, for example, OPGW (optical ground wire).

In the example in FIG. 17, the identification unit 22 includes information that associates the position of the optical fiber 11 for sensing with the actual geographical position and height. For example, as shown in FIG. 18, the identification unit 22 may include an association table that associates the distance from the optical fiber sensing apparatus 20 on the optical fiber 11 for sensing, and the height at which the optical fiber 11 for sensing is laid, with each area or point on a map. Accordingly, the identification unit 22 can not only determine which area on the map the identified monitoring target is in, in a planar manner, but also determine which height the target is at. As a result, the identification unit 22 can three-dimensionally grasp the monitoring target. For example, in a case where the monitoring target is the wind flow rate, the identification unit 22 can three-dimensionally identify the wind flow rate. In this case, for example, the identification unit 22 may estimate the height of the monitoring target in a combined manner from the sensing information detected at different heights. For example, the identification unit 22 may identify the height and direction of the monitoring target at a height of five meters, from the sensing information on the optical fiber 11A for sensing detected at a height of zero, and the sensing information on the optical fiber 11B for sensing detected at a height of 10 meters. Further alternatively, in a case of performing combined estimation, the identification unit 22 may estimate the vibrations and intensities of sounds, distributions and the like at individual height positions, for example. Here, the position on the optical fiber 11 for sensing is not limited to the distance from the optical fiber sensing apparatus 20, and may be, for example, the distance from a specific point on the optical fiber 11 for sensing. The actual geographical position and height is not limited to an area on the map. Alternatively, an area or a point may be managed by character information. Note that the identification unit 22 may hold an association table as shown in FIG. 18, for each of the optical fibers 11A and 11C for sensing.

The types of easily detectable sensing information are different among the optical fibers 11 for sensing, depending on the states of being laid. For example, the optical fiber 11 for sensing buried in the earth easily detects vibrations, while the optical fiber 11 for sensing laid in the air easily detects sounds. The types of easily detectable sensing information through the optical fiber 11 for sensing are different, also depending on the structures where the fibers are laid. Accordingly, the identification unit 22 may identify the monitoring target in a combined manner, by combining different types of sensing information respectively detected by optical fibers 11 for sensing laid in states different from each other. For example, in the case of identifying the type of an accident occurring on a road, the identification unit 22 may identify the type of the accident, based on vibrations detected by the optical fiber 11 for sensing buried in the earth, and sounds detected by the optical fiber 11 for sensing overhead-wired in the air.

The optical fiber networks 10 may be deployed at a marine part and a land part in the same area. The identification unit 22 may monitor the fluctuation in seawater temperature, based on temperature detected through the optical fiber network 10 deployed at the marine part, while monitoring crustal movement, based on vibrations detected through the optical fiber network 10 deployed at the land part. The identification unit 22 may then identify the causal relationship between the fluctuation in seawater temperature and the fluctuation of crustal movement. For example, the identification unit 22 can identify which earth crust is fluctuated by a possible fluctuation in seawater temperature, and how it fluctuates.

<Specific Example of Identifying Behaviors of Person and Vehicle>

The identification unit 22 can identify the behavior of a person in a building, based on sensing information collected from the optical fiber network 10 deployed in the building. The identification unit 22 can identify the behavior of a vehicle on a road, based on sensing information collected from the optical fiber network 10 deployed along the road. The identification unit 22 can further identify a series of behaviors, based on the behavior of the person and the behavior of the vehicle. Hereinafter, a method of identifying the behaviors of the person and the vehicle is described.

Figure 19:
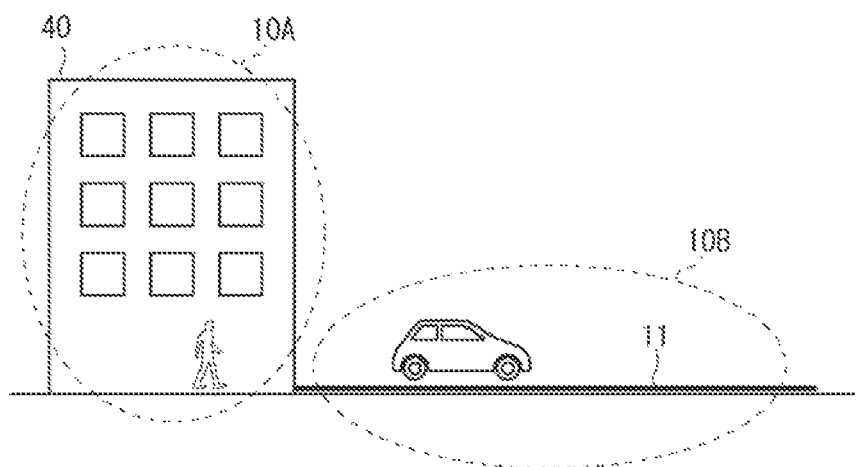
FIG. 19 shows an example of a method of the identification unit identifying the behaviors of a person and a vehicle according to the example embodiment.

In the example in FIG. 19, the optical fiber network 10A is laid in a building 40, which is a built object, and the optical fiber network 10B is laid along a road. The identification unit 22 can identify the behavior of a person in the building 40, based on the vibration pattern, the acoustic pattern and the like included in sensing information collected from the optical fiber network 10A. The identification unit 22 can identify the behavior of a vehicle on a road, based on the vibration pattern and the like included in sensing information collected from the optical fiber network 10B.

For example, the identification unit 22 can identify the behavior and the way of walking of each person in the building 40, based on the vibration pattern and the like included in the sensing information collected from the optical fiber network 10A, and identify the content of conversations of people in the building 40, based on the acoustic pattern and the like included in the sensing information collected from the optical fiber network 10A. As a result, it is assumed that the identification unit 22 identifies people having suspicious behaviors, based on the behaviors, the ways of walking, the content of conversations and the like of the people in the building 40. It is also assumed that after identifying the people, the identification unit 22 identifies that one vehicle starts traveling around the building 40 at a timing when the people become undetectable, based on the vibration patterns and the like included in the sensing information collected from the optical fiber network 10B. In this case, the identification unit 22 can determine that the people having been in the building 40 board the one vehicle. Subsequently, the identification unit 22 may track the vehicle, based on the vibration pattern and the like included in sensing information collected from the optical fiber network 10B.

Figure 20:
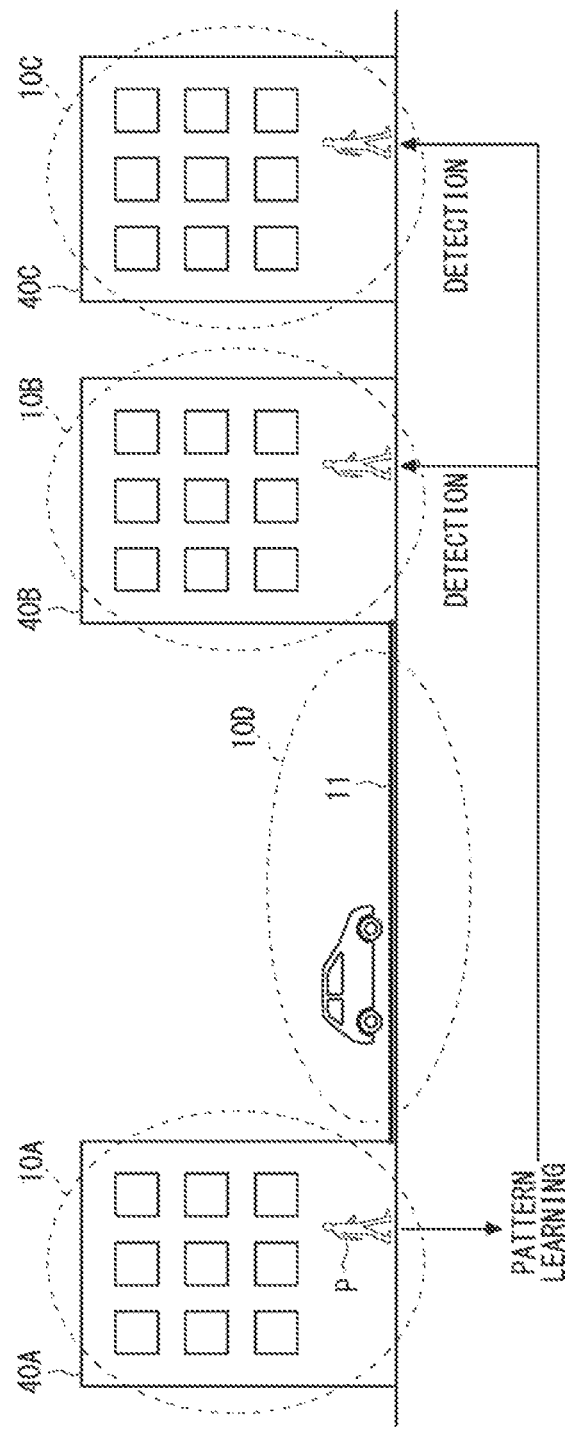
FIG. 20 shows an example of a method of the identification unit identifying the behaviors of a person and a vehicle according to the example embodiment.

In the example in FIG. 20, three optical fiber networks 10A to 10C are deployed respectively in three buildings 40A to 40C different from each other, and an optical fiber network 10D is deployed along the road. The identification unit 22 can identify the behaviors of people in the buildings 40A to 40C, based on the vibration pattern, the acoustic pattern and the like included in sensing information collected from the optical fiber networks 10A to 10C. The identification unit 22 can identify the behavior of a vehicle on a road, based on the vibration pattern and the like included in sensing information collected from the optical fiber network 10D.

For example, it is assumed that the identification unit 22 identifies a person P having suspicious behaviors, based on the behavior, the way of walking, the content of conversations and the like of each person in the buildings 40A. In this case, the identification unit 22 learns the patterns of the behavior, the way of walking, and the content of conversations of the people P, and preliminarily stores the learned patterns, as patterns for matching, in the storage unit, not shown. Hereinafter, the identification unit 22 identifies the patterns of the behaviors, the ways of walking, and the content of conversations in the buildings 40B and 40C, based on the vibration pattern, acoustic pattern and the like included in sensing information collected from the optical fiber networks 10B and 10C, and compares the identified pattern with the pattern for matching of the people P. As a result, when the matching rate between the pattern identified for the people in the buildings 40B and 40C, and the pattern for matching for the people P is equal to or higher than a threshold, the identification unit 22 can determine that the people P have moved to the buildings 40B and 40C.

When the identification unit 22 determines that the people P in the building 40A have boarded the vehicle, this unit may track the vehicle, based on the vibration pattern and the like included in sensing information collected from the optical fiber network 10D. Note that in the example in FIG. 20, tracking of the vehicle may be optional. Accordingly, deployment of the optical fiber network 10D may also be optional.

<Another Specific Example of Method of Identifying Monitoring Target>

For example, one of the two optical fibers 11 for sensing included in the two optical fiber networks 10 may be implemented in clothes, and the other may be embedded in a bed. When a person wearing the clothes is sleeping on the bed, the identification unit 22 may identify the state of the person, based on the vibration pattern, the acoustic pattern, the temperature pattern and the like included in sensing information collected from the optical fiber 11 for sensing implemented in the clothes and the optical fiber 11 for sensing embedded in the bed. For example, the identification unit 22 can identify the state of the person, based on the patterns and the like of the vibrations of bodily organs, coronary tones, and body temperature. Furthermore, an optical fiber 11 for sensing may be laid on a floor or the like of a room where the bed is installed, and the identification unit 22 may identify the state of the person, further using the vibration pattern and the like included in sensing information collected from the optical fiber 11 for sensing laid on the floor.

An optical fiber network 10 deployed in a wide area, and a partially deployed optical fiber network 10 may be combined. The identification unit 22 may identify a monitoring target, based on the vibration pattern included in sensing information collected from the combined optical fiber networks 10.

Figure 21:
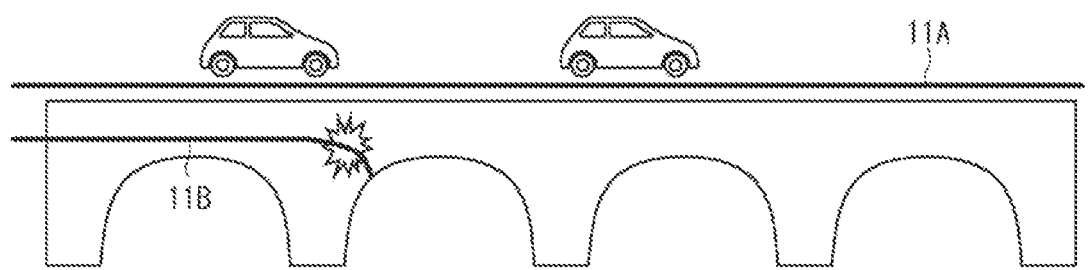
FIG. 21 shows an example of a method of laying one of two optical fibers for sensing along an entire bridge and partially laying the other at a deteriorating site.

For example, as shown in FIG. 21, the optical fiber 11A for sensing included in the optical fiber network 10A is laid entirely on a bridge. Meanwhile, the optical fiber 11B for sensing included in the optical fiber network 10B is partially laid at a deteriorating site where cracks or the like occur. The identification unit 22 then identifies the monitoring target, based on the vibration pattern included in sensing information collected from the optical fibers 11A and 11B for sensing. In this case, for example, the identification unit 22 may identify the traveling state of a vehicle or trains traveling on the bridge, based on the vibration pattern and the like included in sensing information collected from the optical fiber 11A for sensing, and identify the causal relationship between the traveling state and the deteriorating site. For example, the identification unit 22 can identify what traveling state reduces the degree of deterioration at the deteriorating site.

An optical fiber network 10 including an optical fiber 11 for sensing laid on the seafloor, and an optical fiber network 10 including an optical fiber 11 for sensing laid in a ship may be combined. The identification unit 22 may identify a monitoring target, based on the vibration pattern and the like included in sensing information collected from the combined optical fiber networks 10. For example, the identification unit 22 may identify the state of waves, based on the vibration pattern and the like included in sensing information collected from the optical fiber 11 for sensing laid on the seafloor, and identify the state and the like of a cargo loaded on the ship, based on the vibration pattern and the like included in sensing information collected from the optical fiber 11 for sensing laid in the ship. In a case where the ship has a risk of rollover, the identification unit 22 may then determine whether the factor is due to waves or is another factor (due to the cargo or the like loaded on the ship).

<Notification About Alert Through GUI Screen>

Figure 22:
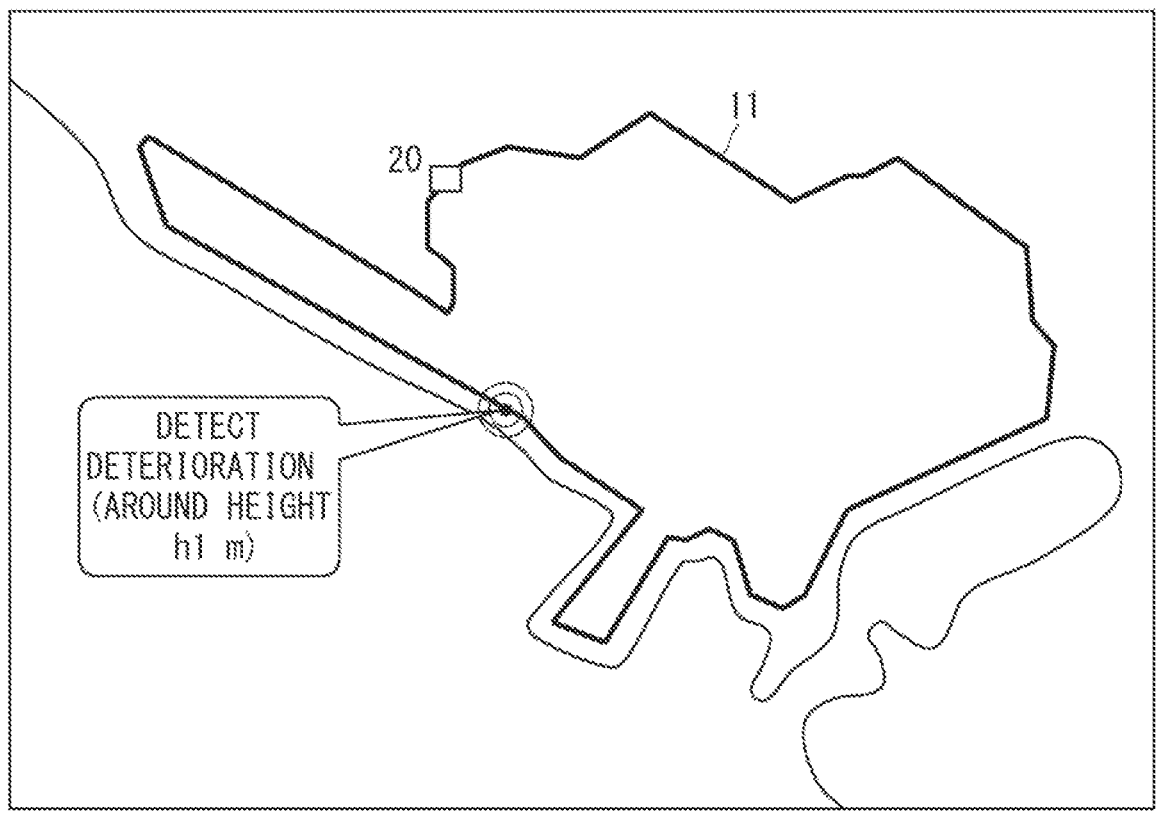
FIG. 22 shows an example of a GUI screen that the identification unit displays on a display unit according to the example embodiment.

When the identification unit 22 identifies the monitoring target, this unit may issue an alert to the identified monitoring target if the target is of a certain type. For example, the identification unit 22 may issue the notification described above, by displaying a GUI (Graphical User Interface) screen on a monitoring system that monitors the monitoring target, or a display unit owned by a person monitoring the monitoring target. In this case, the GUI screen visually displays, for example, map information indicating an area monitored through the optical fiber networks 10, information about the laid optical fibers 11 for sensing, information about the identified monitoring target, and information about an area or a point where the monitoring target is detected. An example of this GUI screen is shown in FIG. 22. FIG. 22 shows the example where the monitoring target is deterioration of a structure, and displays, on a map, the position at which the structure deteriorates. FIG. 22 assumes that the identification unit 22 holds an association table as shown in FIG. 18, and also shows information on the height of a deteriorating site of the structure. The monitoring target displayed on the GUI screen is not limited to the deteriorating site, and includes various targets, such as the states and traffic of a vehicle and trains, and the behaviors of people.

<Distributed Configuration of Optical Fiber Sensing Apparatus>

In the above description, the optical fiber sensing apparatus 20 is provided with the plurality of configuration elements (the reception unit 21 and the identification unit 22). However, there is no limitation thereto. The configuration elements provided in the optical fiber sensing apparatus 20 are not limited to a mode of being provided in a single apparatus, and may be provided in a plurality of apparatuses in a distributed manner instead.

<Hardware Configuration of Optical Fiber Sensing Apparatus>

Subsequently, referring to FIG. 23, the hardware configuration of a computer 50 that achieves the optical fiber sensing apparatus 20 is described.

Figure 23:
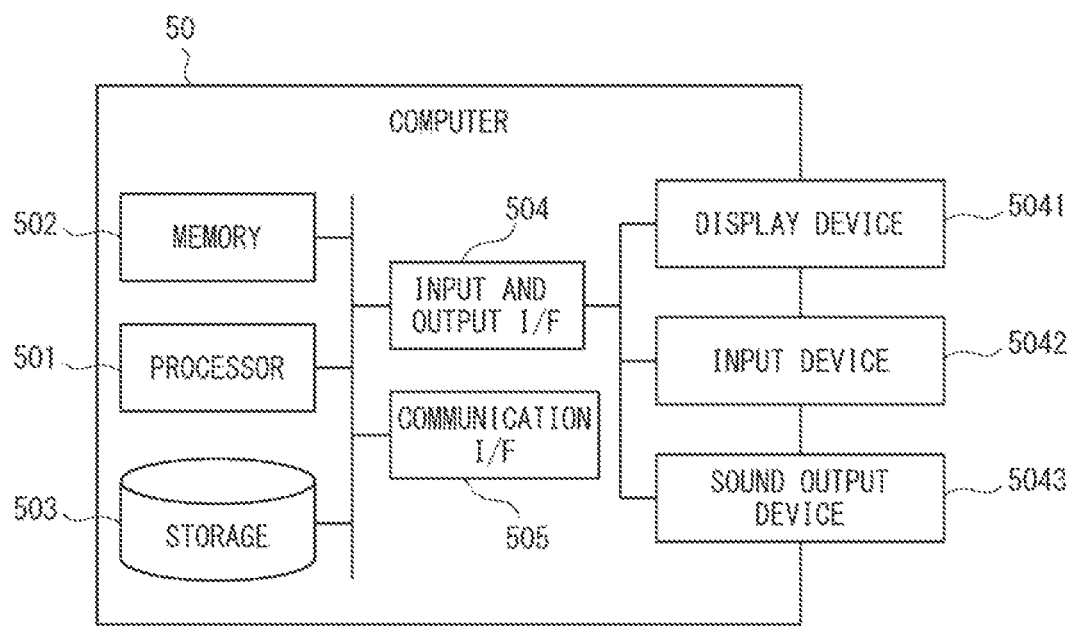
FIG. 23 is a block diagram showing an example of a hardware configuration of a computer that achieves the optical fiber sensing apparatus according to the example embodiment.

As shown in FIG. 23, the computer 50 includes a processor 501, a memory 502, a storage 503, an input and output interface (input and output I/F) 504, and a communication interface (communication I/F) 505. The processor 501, the memory 502, the storage 503, the input and output interface 504, and the communication interface 505 are connected through a data transmission path for transmitting and receiving data to and from each other.

The processor 501 is, for example, a computational processing device, such as a CPU (Central Processing Unit) or a GPU (Graphics Processing Unit). The memory 502 is a memory, such as a RAM (Random-Access Memory) and a ROM (Read-Only Memory), for example. The storage 503 is, for example, a storage device, such as an HDD (Hard Disk Drive), an SSD (Solid State Drive) or a memory card. The storage 503 may be a memory, such as a RAM or a ROM.

The storage 503 stores programs for achieving the functions of the configuration elements (the reception unit 21 and the identification unit 22) that the optical fiber sensing apparatus 20 includes. The processor 501 achieves the functions of the configuration elements that the optical fiber sensing apparatus 20 includes, by executing these programs. Here, when executing the programs, the processor 501 may read the programs into the memory 502 and then execute the programs, or may execute the programs without reading the programs into the memory 502. The memory 502 and the storage 503 also play a role of storing information and data held by the configuration elements included in the optical fiber sensing apparatus 20.

The programs described above are stored using various types of non-transitory computer-readable media, and can be supplied to computers (including the computer 50). The non-transitory computer-readable media include various types of tangible storage media. Examples of the non-transitory computer-readable media include a magnetic recording medium (e.g., a flexible disk, a magnetic tape, and a hard disk drive), a magnetooptical recording medium (e.g., a magnetooptical disk), a CD-ROM (Compact Disc-ROM) a CD-R (CD-Recordable) a CD-R/W (CD-ReWritable), a semiconductor memory (e.g., mask ROM, a PROM (Programmable ROM), an EPROM (Erasable PROM), a flash ROM, and a RAM. The programs may be provided for the computer through various types of transitory computer readable media. Examples of transitory computer readable media include an electric signal, an optical signal, and electromagnetic waves. The transitory computer readable media can provide programs for the computer via a wired communication path, such as an electric wire or an optical fiber, or a wireless communication path.

The input and output interface 504 is connected to a display device 5041, an input device 5042, a sound output device 5043 and the like. The display device 5041 is a device, such as an LCD (Liquid Crystal Display), a CRT (Cathode Ray Tube) display, or a monitor, for displaying a screen corresponding to drawing data processed by the processor 501. The input device 5042 is a device that accepts an operation input by an operator, and is, for example, a keyboard, a mouse, a touch sensor or the like. The display device 5041 and the input device 5042 may be integrated and achieved as a touch panel. The sound output device 5043 is a device, such as a speaker, for acoustically outputting sounds corresponding to acoustic data processed by the processor 501.

The communication interface 505 transmits and receives data to and from an external apparatus. For example, the communication interface 505 communicates with an external apparatus via a wired communication path or a wireless communication path.

The present disclosure has been described above with reference to the example embodiment. However, the present disclosure is not limited to the example embodiment described above. The configuration and details of the present disclosure can be variously modified in a manner understandable by those skilled in the art within the scope of the present disclosure.

A part of or the entire example embodiment described above can be described as in the following Supplemental notes. However, there is no limitation to the following description.

(Supplementary Note 1)

An optical fiber sensing system, comprising:
 a first optical fiber network configured to detect first sensing information about a monitoring target;
 a second optical fiber network configured to detect second sensing information about the monitoring target;
 a first reception unit configured to receive a first light signal from the first optical fiber network;
 a second reception unit configured to receive a second light signal from the second optical fiber network; and
 an identification unit configured to identify the monitoring target, based on the first sensing information included in the first light signal, and the second sensing information included in the second light signal.

(Supplementary Note 2)

The optical fiber sensing system according to Supplementary note 1, wherein
 the first reception unit receives the first light signal from the first optical fiber network owned by a first business operator, and
 the second reception unit receives the second light signal from the second optical fiber network owned by a second business operator.

(Supplementary Note 3)

The optical fiber sensing system according to Supplementary note 1 or 2, further comprising a database configured to preliminarily store a policy about disclosure of the first sensing information and the second sensing information,
 wherein the identification unit applies filtering to the first sensing information and the second sensing information, based on the policy, and identifies the monitoring target, based on the sensing information having not been excluded by the filtering between the first sensing information and the second sensing information.

(Supplementary Note 4)

The optical fiber sensing system according to Supplementary note 1, wherein
 the first reception unit receives the first light signal from the first optical fiber network deployed in a first area, and
 the second reception unit receives the second light signal from the second optical fiber network deployed in a second area.

(Supplementary Note 5)

The optical fiber sensing system according to Supplementary note 4, wherein
 the first area and the second area are separated from each other, and
 the identification unit
 identifies the monitoring target in the first area, based on the first sensing information included in the first light signal,
 identifies the monitoring target in the second area, based on the second sensing information included in the second light signal, and
 estimates the monitoring target in a third area between the first area and the second area, based on an identification result of the monitoring target in the first area, and an identification result of the monitoring target in the second area.

(Supplementary Note 6)

The optical fiber sensing system according to any one of Supplementary notes 1 to 5, wherein the identification unit identifies the monitoring target, based on a specific dynamic fluctuation pattern according to the monitoring target included in the first sensing information and the second sensing information.

(Supplementary Note 7)

The optical fiber sensing system according to any one of Supplementary notes 1 to 6, wherein the first sensing information and the second sensing information include at least one of vibrations, sounds, and a temperature.

(Supplementary Note 8)

An optical fiber sensing method performed by an optical fiber sensing system, the method comprising:
 a first reception step of receiving a first light signal from a first optical fiber network that detects first sensing information about a monitoring target;
 a second reception step of receiving a second light signal from a second optical fiber network that detects second sensing information about the monitoring target; and an identification step of identifying the monitoring target, based on the first sensing information included in the first light signal, and the second sensing information included in the second light signal.

(Supplementary Note 9)

The optical fiber sensing method according to Supplementary note 8, wherein the first reception step receives the first light signal from the first optical fiber network owned by a first business operator, and the second reception step receives the second light signal from the second optical fiber network owned by a second business operator.

(Supplementary Note 10)

The optical fiber sensing method according to Supplementary note 8 or 9, further comprising a step of preliminarily storing, in a database, a policy about disclosure of the first sensing information and the second sensing information, wherein the identification step applies filtering to the first sensing information and the second sensing information, based on the policy, and identifies the monitoring target, based on the sensing information having not been excluded by the filtering between the first sensing information and the second sensing information.

(Supplementary Note 11)

The optical fiber sensing method according to Supplementary note 8, wherein the first reception step receives the first light signal from the first optical fiber network deployed in a first area, and the second reception step receives the second light signal from the second optical fiber network deployed in a second area.

(Supplementary Note 12)

The optical fiber sensing method according to Supplementary note 11, wherein the first area and the second area are separated from each other, and the identification step identifies the monitoring target in the first area, based on the first sensing information included in the first light signal, identifies the monitoring target in the second area, based on the second sensing information included in the second light signal, and estimates the monitoring target in a third area between the first area and the second area, based on an identification result of the monitoring target in the first area, and an identification result of the monitoring target in the second area.

(Supplementary Note 13)

The optical fiber sensing method according to any one of Supplementary notes 8 to 12, wherein the identification step identifies the monitoring target, based on a specific dynamic fluctuation pattern according to the monitoring target included in the first sensing information and the second sensing information.

(Supplementary Note 14)

The optical fiber sensing method according to any one of Supplementary notes 8 to 13, wherein the first sensing information and the second sensing information include at least one of vibrations, sounds, and a temperature.

(Supplementary Note 15)

An optical fiber sensing apparatus, comprising:

a first reception unit configured to receive a first light signal from a first optical fiber network that detects first sensing information about a monitoring target;

a second reception unit configured to receive a second light signal from a second optical fiber network that detects second sensing information about the monitoring target; and an identification unit configured to identify the monitoring target, based on the first sensing information included in the first light signal, and the second sensing information included in the second light signal.

(Supplementary Note 16)

The optical fiber sensing apparatus according to Supplementary note 15, wherein the first reception unit receives the first light signal from the first optical fiber network owned by a first business operator, and the second reception unit receives the second light signal from the second optical fiber network owned by a second business operator.

(Supplementary Note 17)

The optical fiber sensing apparatus according to Supplementary note 15 or 16, further comprising a database configured to preliminarily store a policy about disclosure of the first sensing information and the second sensing information, wherein the identification unit applies filtering to the first sensing information and the second sensing information, based on the policy, and identifies the monitoring target, based on the sensing information having not been excluded by the filtering between the first sensing information and the second sensing information.

(Supplementary Note 18)

The optical fiber sensing apparatus according to Supplementary note 15, wherein the first reception unit receives the first light signal from the first optical fiber network deployed in a first area, and the second reception unit receives the second light signal from the second optical fiber network deployed in a second area.

(Supplementary Note 19)

The optical fiber sensing apparatus according to Supplementary note 18, wherein the first area and the second area are separated from each other, and the identification unit identifies the monitoring target in the first area, based on the first sensing information included in the first light signal, identifies the monitoring target in the second area, based on the second sensing information included in the second light signal, and estimates the monitoring target in a third area between the first area and the second area, based on an identification result of the monitoring target in the first area, and an identification result of the monitoring target in the second area.

(Supplementary Note 20)

The optical fiber sensing apparatus according to any one of Supplementary notes 15 to 19, wherein the identification unit identifies the monitoring target, based on a specific dynamic fluctuation pattern according to the monitoring target included in the first sensing information and the second sensing information.

(Supplementary Note 21)

The optical fiber sensing apparatus according to any one of Supplementary notes 15 to 20, wherein the first sensing information and the second sensing information include at least one of vibrations, sounds, and a temperature.

REFERENCE SIGNS LIST 10, 10A, 10B, 10C OPTICAL FIBER NETWORK
11, 11A, 11B, 11C OPTICAL FIBER FOR SENSING
20 OPTICAL FIBER SENSING APPARATUS
21, 21A, 21B, 21C RECEPTION UNIT
22 IDENTIFICATION UNIT
23 POLICY DB
30 NETWORK FOR OPTICAL FIBER COMMUNICATION
40, 40A, 40B, 40C BUILDING
50 COMPUTER
501 PROCESSOR
502 MEMORY
503 STORAGE
504 INPUT AND OUTPUT INTERFACE
5041 DISPLAY DEVICE
5042 INPUT DEVICE
5043 SOUND OUTPUT DEVICE
505 COMMUNICATION INTERFACE

What is claimed is:

1. An optical fiber sensing system, comprising:
a first optical fiber network deployed in a first area and configured to detect first sensing information about a monitoring target;
a second optical fiber network deployed in a second area separated from the first area and configured to detect second sensing information about the monitoring target;
a first receiver configured to receive a first light signal from the first optical fiber network;
a second receiver configured to receive a second light signal from the second optical fiber network; and
at least one processor configured to identify the monitoring target, using the first sensing information included in the first light signal, and the second sensing information included in the second light signal,
wherein the at least one processor is configured to identify the monitoring target in the first area, using the first sensing information included in the first light signal,
wherein the at least one processor is configured to identify the monitoring target in the second area, using the second sensing information included in the second light signal, and
wherein the at least one processor is configured to estimate the monitoring target in a third area between the first area and the second area, using an identification result of the monitoring target in the first area, and an identification result of the monitoring target in the second area.

2. The optical fiber sensing system according to claim 1, wherein the first receiver is configured to receive the first light signal from the first optical fiber network, which is owned by a first business operator, and
wherein the second receiver is configured to receive the second light signal from the second optical fiber network, which is owned by a second business operator.

3. The optical fiber sensing system according to claim 1, further comprising a database configured to preliminarily store a policy about disclosure of the first sensing information and the second sensing information,
wherein the at least one processor is configured to apply filtering to the first sensing information and the second sensing information, using the policy, and
wherein the at least one processor is configured to identify the monitoring target, using the sensing information having not been excluded by the filtering.

4. The optical fiber sensing system according to claim 1, wherein the at least one processor is configured to identify the monitoring target, using a specific dynamic fluctuation pattern according to the monitoring target included in the first sensing information and the second sensing information.

5. The optical fiber sensing system according to claim 1, wherein the first sensing information and the second sensing information include at least one of a vibration, a sound, and a temperature.

6. An optical fiber sensing method performed by an optical fiber sensing system, the method comprising:
a first reception operation comprising receiving a first light signal from a first optical fiber network deployed in a first area and that detects first sensing information about a monitoring target;
a second reception operation comprising receiving a second light signal from a second optical fiber network deployed in a second area separated from the first area and that detects second sensing information about the monitoring target; and
an identification operation comprising identifying, by at least one processor, the monitoring target, using the first sensing information included in the first light signal, and the second sensing information included in the second light signal,
wherein the identification operation comprises identifying the monitoring target in the first area, using the first sensing information included in the first light signal,
wherein the identification operation comprises identifying the monitoring target in the second area, using the second sensing information included in the second light signal, and
wherein the method further comprises estimating, by the at least one processor, the monitoring target in a third area between the first area and the second area, using an identification result of the monitoring target in the first area, and an identification result of the monitoring target in the second area.

7. The optical fiber sensing method according to claim 6, wherein the first reception operation comprises receiving the first light signal from the first optical fiber network, which is owned by a first business operator, and
wherein the second reception operation comprises receiving the second light signal from the second optical fiber network, which is owned by a second business operator.

8. The optical fiber sensing method according to claim 6, further comprising preliminarily storing, in a database, a policy about disclosure of the first sensing information and the second sensing information,
wherein the identification operation comprises:
applying filtering to the first sensing information and the second sensing information, using the policy; and
identifying the monitoring target, using the sensing information having not been excluded by the filtering.

9. The optical fiber sensing method according to claim 6, wherein the identification operation comprises identifying the monitoring target, using a specific dynamic fluctuation pattern according to the monitoring target included in the first sensing information and the second sensing information.

10. An optical fiber sensing apparatus, comprising:
- a first receiver configured to receive a first light signal from a first optical fiber network deployed in a first area and configured to detect first sensing information about a monitoring target;
- a second receiver configured to receive a second light signal from a second optical fiber network deployed in a second area separated from the first area and configured to detect second sensing information about the monitoring target; and
- at least one processor configured to identify the monitoring target, using the first sensing information included in the first light signal, and the second sensing information included in the second light signal,
- wherein the at least one processor is configured to identify the monitoring target in the first area, using the first sensing information included in the first light signal,
- wherein the at least one processor is configured to identify the monitoring target in the second area, using the second sensing information included in the second light signal, and
- wherein the at least one processor is configured to estimate the monitoring target in a third area between the first area and the second area, using an identification result of the monitoring target in the first area, and an identification result of the monitoring target in the second area.

11. The optical fiber sensing apparatus according to claim 10, wherein the first receiver is configured to receive the first light signal from the first optical fiber network, which is owned by a first business operator, and
wherein the second receiver is configured to receive the second light signal from the second optical fiber network, which is owned by a second business operator.

12. The optical fiber sensing apparatus according to claim 10, further comprising a database configured to preliminarily store a policy about disclosure of the first sensing information and the second sensing information,
wherein the at least one processor is configured to apply filtering to the first sensing information and the second sensing information, using the policy, and
wherein the at least one processor is configured to identify the monitoring target, using the sensing information having not been excluded by the filtering.

13. The optical fiber sensing apparatus according to claim 10, wherein the at least one processor is configured to identify the monitoring target, using a specific dynamic fluctuation pattern according to the monitoring target included in the first sensing information and the second sensing information.

14. The optical fiber sensing apparatus according to claim 10, wherein the first sensing information and the second sensing information include at least one of a vibration, a sound, and a temperature.

* * * * *